US007673955B2

(12) United States Patent
Hung et al.

(10) Patent No.: US 7,673,955 B2
(45) Date of Patent: Mar. 9, 2010

(54) INKJET PRINTER CORRECTION DEVICE AND METHOD

(76) Inventors: Hao-Feng Hung, 5F.-1, No.2, Lane 133, Sec. 2 , Tingzhou Rd., Zhongzheng District, Taipei City 100 (TW); Chun-Jen Lee, 4F., No.6, Lane 1, Baoqiao Rd., Xindian City, Taipei County 231 (TW)

( * ) Notice: Subject to any disclaimer, the term of this patent is extended or adjusted under 35 U.S.C. 154(b) by 360 days.

(21) Appl. No.: 11/005,413

(22) Filed: Dec. 6, 2004

(65) Prior Publication Data

US 2005/0128235 A1 Jun. 16, 2005

(30) Foreign Application Priority Data

Dec. 12, 2003 (TW) .............................. 92135180 A

(51) Int. Cl.
*B41J 29/38* (2006.01)
*B41J 23/00* (2006.01)
*G01M 3/00* (2006.01)

(52) U.S. Cl. ............................... 347/14; 347/9; 347/37; 377/17

(58) Field of Classification Search ..................... 347/9, 347/14, 37; 377/17
See application file for complete search history.

(56) References Cited

U.S. PATENT DOCUMENTS 4,881,248 A * 11/1989 Korechika ................... 377/17
5,170,416 A 12/1992 Goetz et al. ................... 377/17

* cited by examiner

*Primary Examiner*—Matthew Luu
*Assistant Examiner*—Jannelle M Lebron
(74) *Attorney, Agent, or Firm*—Perkins Coie LLP

(57) ABSTRACT

An inkjet printer correction device and method. A correction device having a first circuit generating a first processing signal composed of a first and second pulse signal according to a first and second phase signal produced by an encoder, a second circuit generating a second processing signal based on the position change variation of either the first or second phase signal, a third circuit generating a third processing signal based on the position change variation of either the first or second phase signal, a selector selecting one of the first, second, or third circuits according to the first processing signal. The present invention provides one of the first, second, or third processing signals to control the speed and position of motor of the inkjet printer.

18 Claims, 6 Drawing Sheets

INKJET PRINTER CORRECTION DEVICE AND METHOD

BACKGROUND OF THE INVENTION

1. Field of the Invention

The present invention relates in general to an inkjet printer correction device and method, and in particular to controlling the speed and position of a motor in the inkjet printer.

2. Description of the Related Art

The encoder inside a conventional the printer, outputs inconsistent duty-cycles due to different manufacturing methods. Typically, a correction device is employed to direct the numerals encoders to generate perfect duty-cycles for controlling the speed and position of a motor. This solution however a suffers as it does not increase printing quality, due to the frequent position shifts required to cope with imperfect duty-cycles.

U.S. Pat. No. 5,170,416 discloses an encoder duty-cycle correction device and method for directing an encoder moving on an encoder strip to generate phase signals. A first signal 13 produced based on the position change variation, from high level to low level, of one of the phase signals. The first signal is provided to a divider generating a second signal. Thereafter, the second signal is corrected to become an encoder signal resulting in all signals having the same period.

SUMMARY OF THE INVENTION

Therefore, an object of the present invention is to provide an inkjet printer correction device and method, controlling the speed and position of a motor in the inkjet printer.

The present invention achieves the above-indicated objects by providing a correction device and method, for an inkjet printer with correction device for processing a first and second phase signals, which are both period signals, produced by an encoder on an encoder strip.

The correction device comprises a first circuit generating a first processing signal composed of a first and second pulse signals according to the first and second phase signals, both are generated pulse signals based on the position change variation of first and second phase signals, a second circuit generating a second processing signal based on the position change variation of either the first or second phase signals, a third circuit generating a third processing signal produced based on the position change variation from a first level to a second level of either the first or second phase signals, a selector selecting one of the first, second, or third circuits according to the first processing signal to control the speed and position of the inkjet printer motor.

BRIEF DESCRIPTION OF THE DRAWINGS

The following detailed description, given by way of example and not intended to limit the invention solely to the embodiments described herein, will best by understood in conjunction with the accompanying drawings, in which.

DETAILED DESCRIPTION OF THE INVENTION

First Embodiment

Figure 1:
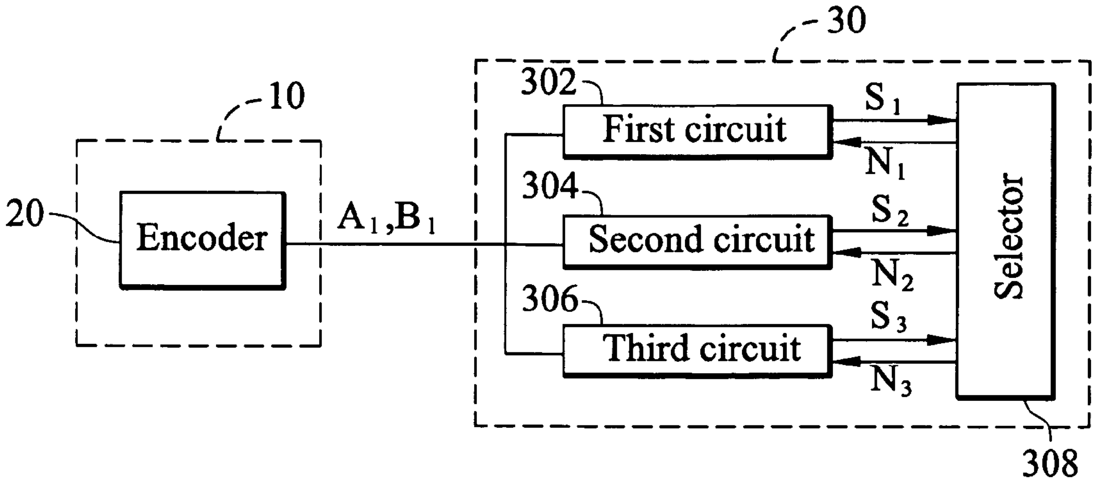
FIG. 1 is a block diagram of the correction device in accordance with the first embodiment of the present invention.

FIG. 1 is a block diagram of the correction device in accordance with the first embodiment of the present invention. A correction device 30 comprises a first circuit 302, a second circuit 304, a third circuit 306, and a selector 308, processing a first phase signal $A_1$ and a second phase signal $B_1$ produced by an encoder 20 on an encoder strip 10.

Figure 2:
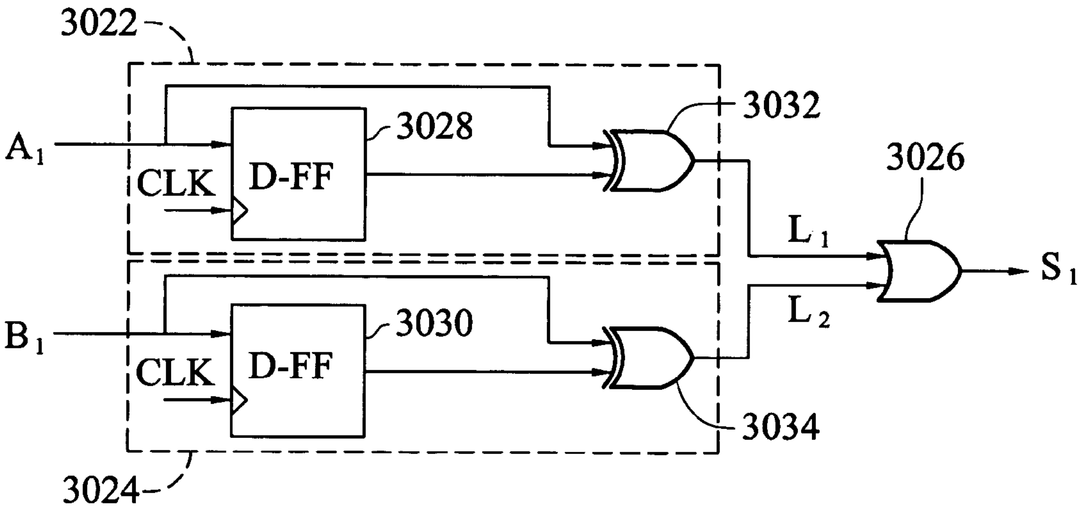
FIG. 2 is a circuit diagram of the first circuit in accordance with the first embodiment of the present invention.

FIG. 2 is a circuit diagram of the first circuit in accordance with the first embodiment of the present invention. The first circuit 302 comprises a first one-shot detection circuit 3022, having a D flip-flop 3028 and a XOR gate 3032, generating a first pulse signal $L_1$ according to detection of up and down edges of the first phase signal $A_1$, a second one-shot detection circuit 3024 comprising a D flip-flop 3030 and a XOR gate 3034, generating a second pulse signal $L_2$ according to detection of up and down edges of the second phase signal $B_1$, an OR gate 3026 coupled to the first one-shot detection circuit 3022 and the second one-shot detection circuit 3024, generating a first processing signal $S_1$, wherein the first pulse signal $L_1$ and the second pulse signal $L_2$ are generated based on the position change variation of either of first phase signal $A_1$ or second phase signal $B_1$.

Figure 3:
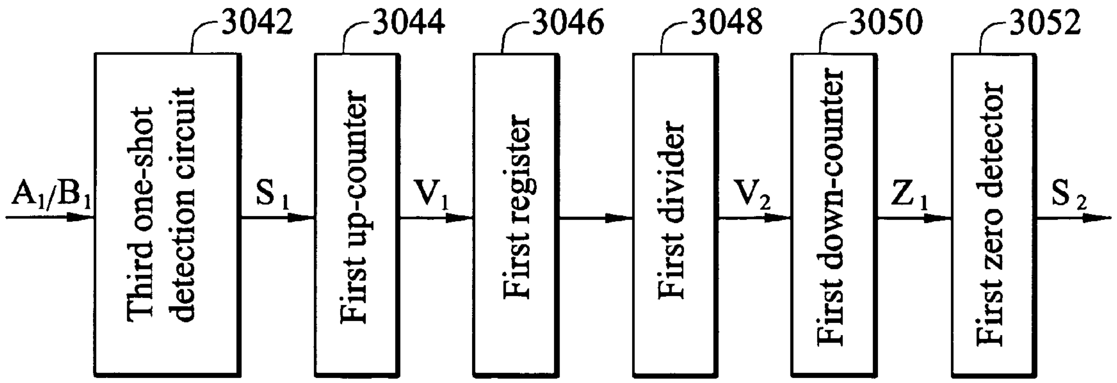
FIG. 3 is a circuit diagram of the second circuit in accordance with the first embodiment of the present invention.

FIG. 3 is a circuit diagram of the second circuit in accordance with the first embodiment of the present invention. The second circuit 304 comprises a third one-shot detection circuit 3042 generating the first processing signal $S_1$ according to detection of up and down edges of either the first phase signal $A_1$ or second phase signal $B_1$, a first count value $V_1$ stored in a first register 3046 as the first processing signal $A_1$ resetting a first up-counter 3044, a first divider 3048 (divided by 2) coupled to the first register 3046, generating a second count value $V_2$ according to the first count value $V_1$ divided by 2, a first down-counter 3050 coupled to the first divider 3048, generating a first zero detection signal $Z_1$ to control a first zero detector 3052 outputting the second processing signal $S_2$ when the second count value $V_2$ is zero, wherein the second processing signal $S_2$, is a half period of the first processing signal $S_1$, based on the position change variation of either the first phase signal $A_1$ or second phase signal $B_1$.

Figure 4:
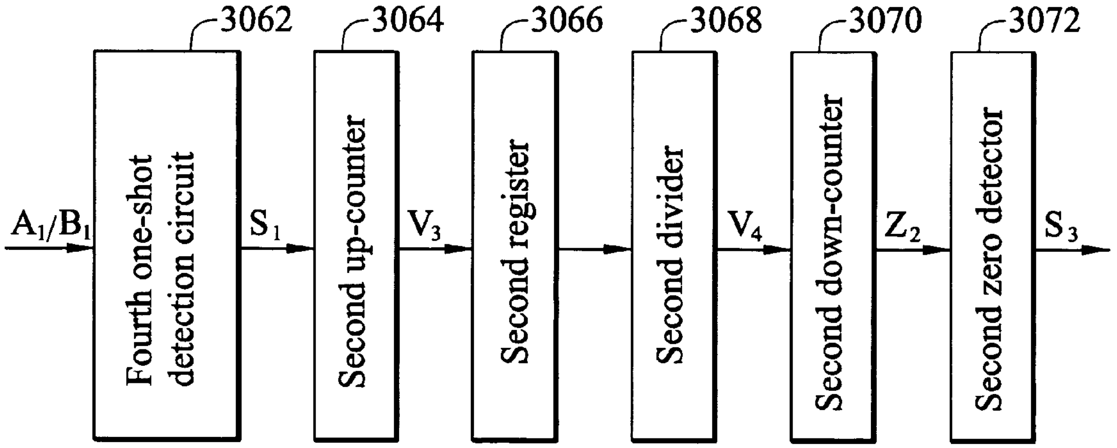
FIG. 4 is a circuit diagram of the third circuit in accordance with the first embodiment of the present invention.

FIG. 4 is a circuit diagram of the third circuit in accordance with the first embodiment of the present invention. The third circuit 306 comprises a fourth one-shot detection circuit 3062 generating the first processing signal $S_1$ according to detection of up or down edges of either of first phase signal $A_1$ or second phase signal $B_1$, a third count value $V_3$ stored in a second register 3066 as the first processing signal $S_1$ resets a second up-counter 3064, a second divider 3068 (divided by 4) coupled to the second register 3066, generating a fourth count value $V_4$ according to the third count value $V_3$ divided by 4, a second down-counter 3070 coupled to the second divider 3068, generating a second zero detection signal $Z_2$ to control a second zero detector 3072 outputting the third processing signal $S_3$ when the fourth count value $V_4$ is zero, wherein the third processing signal $S_3$, is one fourth of the first processing signal $S_1$, based on the position change variation of either of first phase signal $A_1$ or second phase signal $B_1$.

Figure 5:
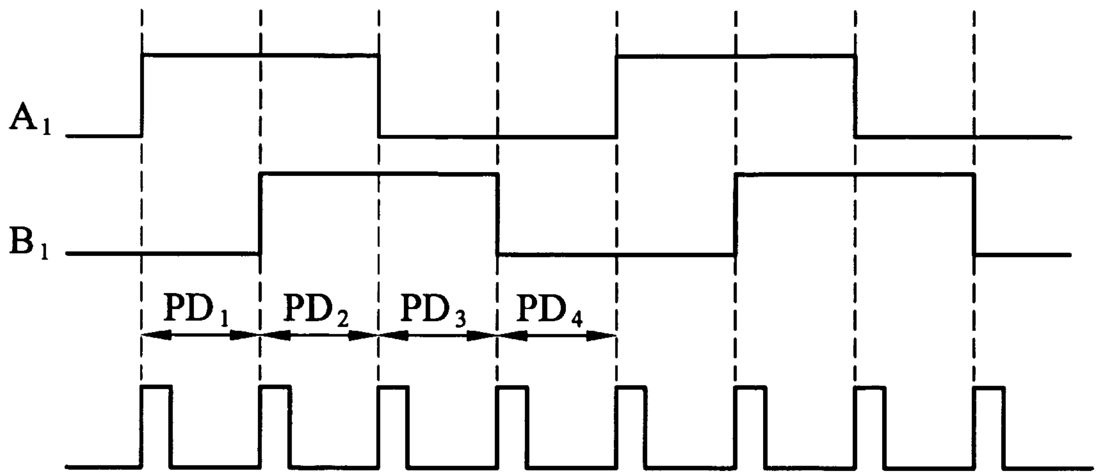
FIG. 5 is a first waveform diagram of the encoder in accordance with the first embodiment of the present invention.
Figure 6:
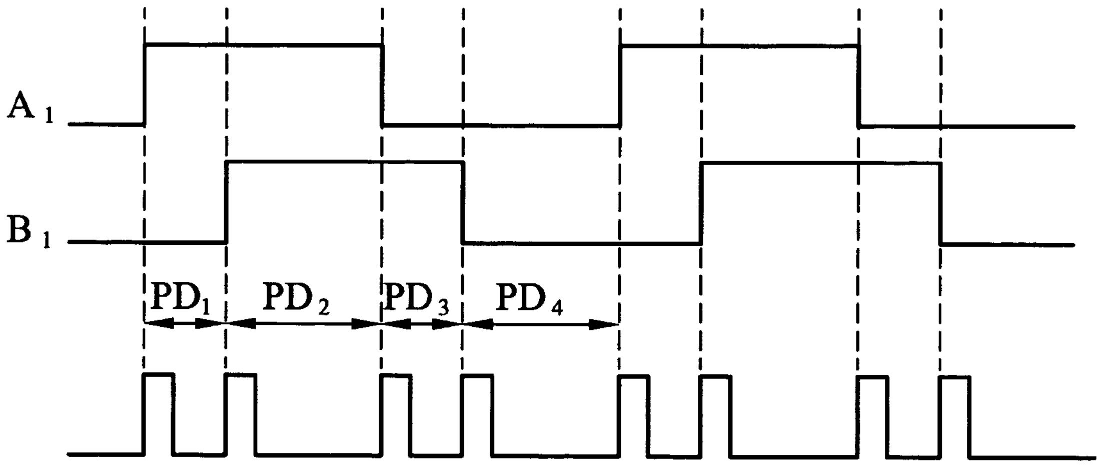
FIG. 6 is a second waveform diagram of the encoder in accordance with the first embodiment of the present invention.
Figure 7:
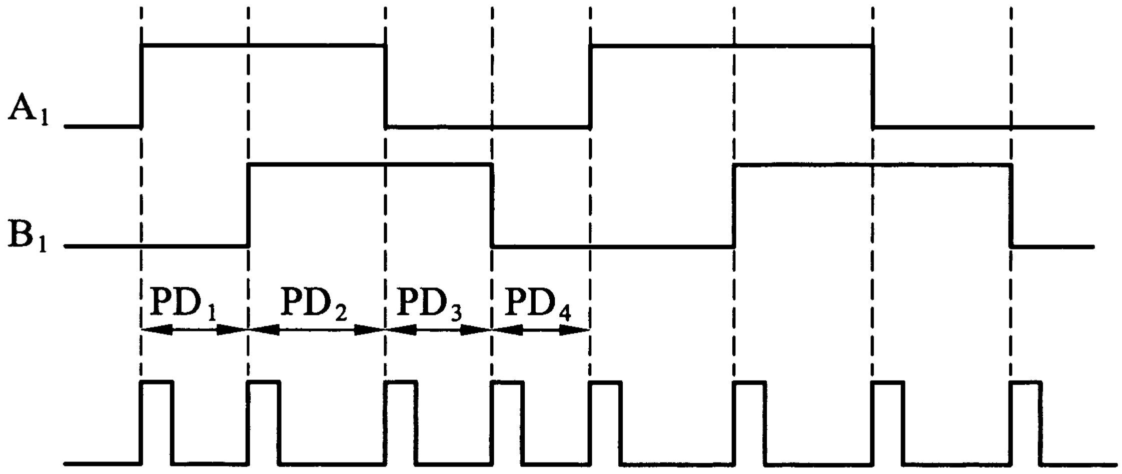
FIG. 7 is a third waveform diagram of the encoder in accordance with the first embodiment of the present invention.

First, second, third, and fourth time intervals ($PD_1$, $PD_2$, $PD_3$, $PD_4$) are acquired by the selector 308 from consecutive and adjacent first pulse signal $L_1$ and second pulse signal $L_2$. FIG. 5 is a first waveform diagram of the encoder in accordance with the first embodiment of the present invention. If all time intervals are equal ($PD_1=PD_2=PD_3=PD_4$), then the first circuit 302 selected by a first selection signal $N_1$ output by the selector 308. FIG. 6 is a second waveform diagram of the encoder in accordance with the first embodiment of the present invention. If the first time interval $PD_1$ plus second time interval $PD_2$ is equal to the third time interval $PD_3$ plus fourth time interval $PD_4$ ($PD_1+PD_2=PD_3+PD_4$), then the second circuit 304 is selected by a second selection signal $N_2$ output by the selector 308. FIG. 7 is a third waveform diagram of the encoder in accordance with the first embodiment of the present invention. In other cases, the third circuit 306 is selected by a third selection signal $N_3$ output by the selector 308.

Second Embodiment

Figure 8:
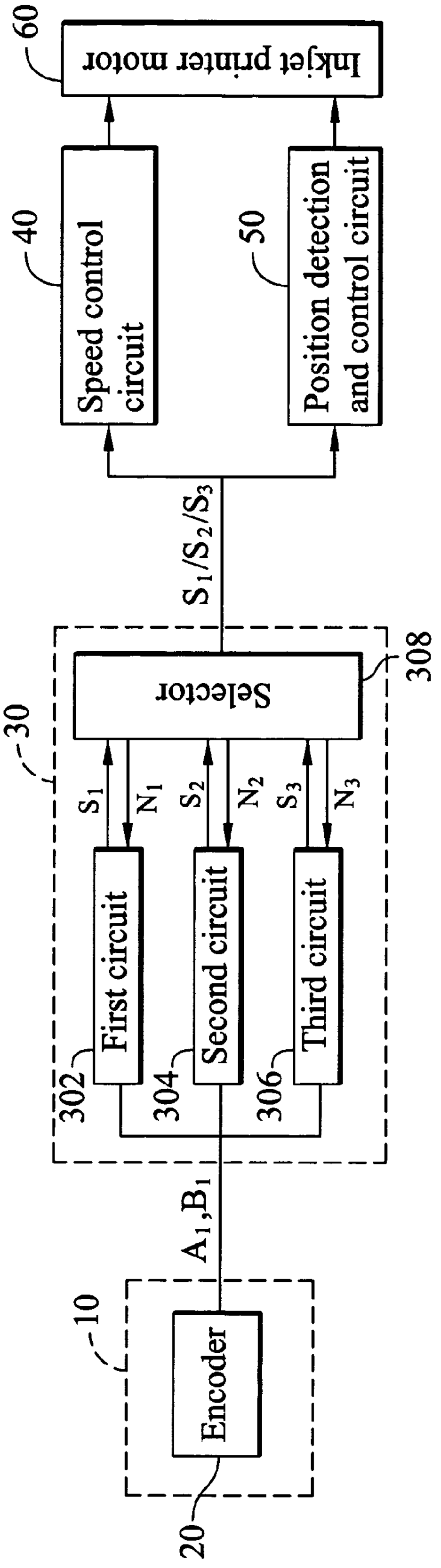
FIG. 8 is a block diagram of the inkjet printer with correction device in accordance with the second embodiment of the present invention.

FIG. 8 is a block diagram of the inkjet printer with correction device in accordance with the second embodiment of the present invention. The inkjet printer with correction device comprises an encoder strip 10, an encoder 20 moving on the encoder strip 10 to generate a first phase signal $A_1$ and a second phase signal $B_1$, both are period signals, a speed control circuit 40 coupled to the selector 308, controlling the speed of inkjet printer motor 60 according to the first processing signal $S_1$, the second processing signal $S_2$, or the third processing signal $S_3$, a position detection and control circuit 50 coupled to the selector 308, controlling the position of inkjet printer motor 60 according to the first processing signal $S_1$, the second processing signal $S_2$, or the third processing signal $S_3$.

Third Embodiment

Figure 9:
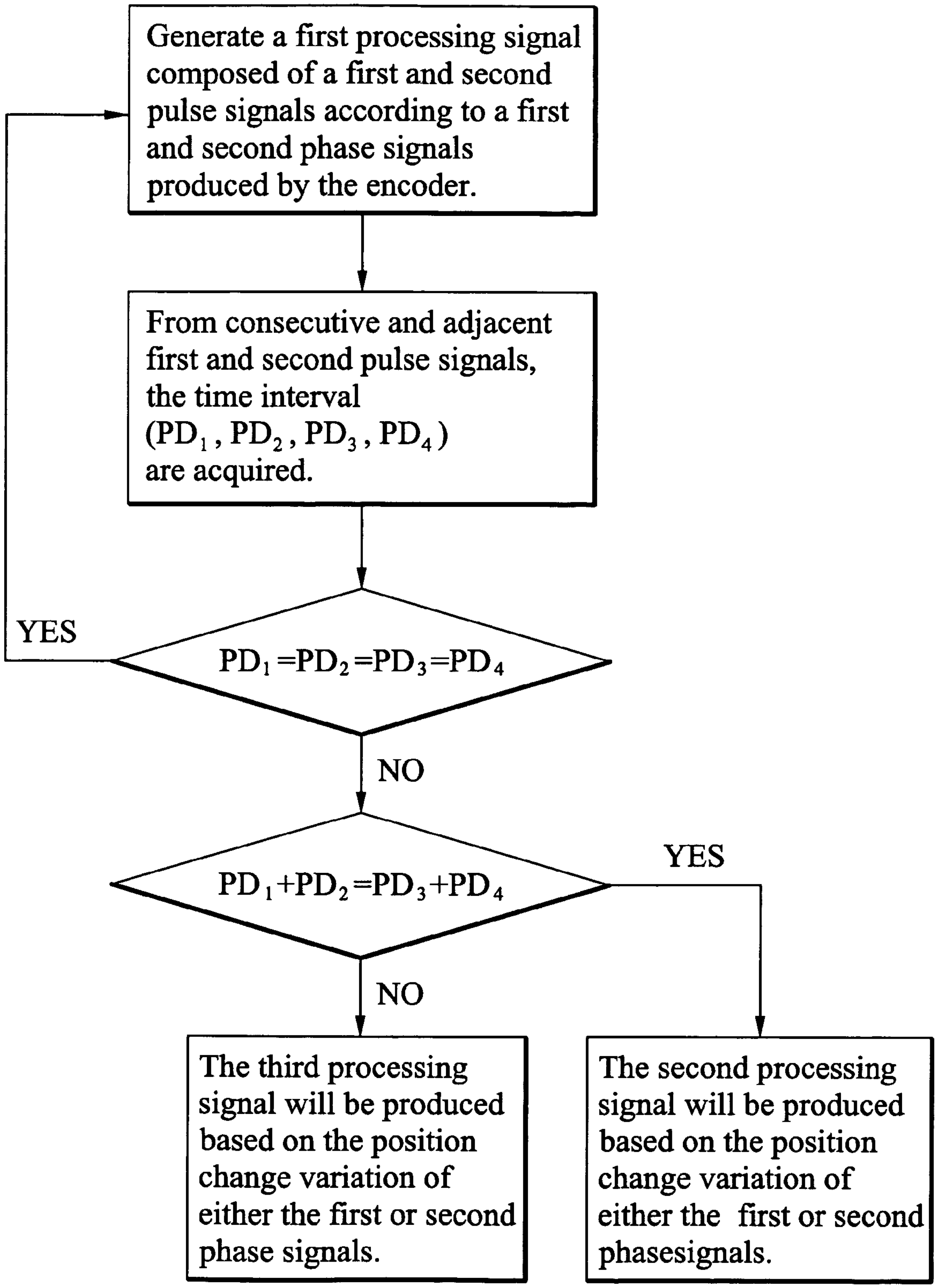
FIG. 9 is a flow chart of the correction method in accordance with the third embodiment of the present invention.

FIG. 9 is a flow chart of the correction method in accordance with the third embodiment of the present invention. The correction method for processing a first phase signal $A_1$ and second phase signal $B_1$, are both period signals, produced by an encoder 20 on an encoder strip.

A first processing signal $S_1$ composed of a first pulse signal $L_1$ and second pulse signal $L_2$ is generated according to the first phase signal $A_1$ and second phase signal $B_1$, both pulse signals are produced based on the position change variation of first phase signal $A_1$ and second phase signal $B_1$. From consecutive and adjacent first pulse signal $L_1$ and second pulse signal $L_2$, a first, second, third, and fourth time interval ($PD_1$, $PD_2$, $PD_3$, $PD_4$) are acquired, wherein the first processing signal $S_1$ is provided to an electronic device, controlling the speed and position of motor 60 as all time intervals are equal ($PD_1=PD_2=PD_3=PD_4$), wherein the second processing signal $S_2$ is a half period of the first processing signal $S_1$.

A second processing signal $S_2$ is generated based on the position change variation of either first phase signal $A_1$ or the second phase signal $B_1$ as the first time interval $PD_1$ plus second time interval $PD_2$ is equal to the third time interval $PD_3$ plus fourth time interval $PD_4$ ($PD_1+PD_2=PD_3+PD_4$), controlling the speed and position of motor 60 of an electronic device. In other cases, generating a third processing signal $S_3$ based on the position change variation from a first level to a second level of either the first phase signal $A_1$ or the second phase signal $B_1$, controlling the speed and position of motor 60 of an electronics device, wherein the third processing signal $S_3$ is one fourth of the first processing signal $S_1$.

In the invention, the correction device is for reducing imperfect duty-cycles output by the encoder or others, reducing manufacturing costs and complexity, and output of signals to control speed and position of the inkjet printer motor, thus increasing printing quality.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A correction device receiving first and second phase signals, wherein each of the phase signals are periodical signals, the correction device comprising:

a first circuit configured to generate a first processing signal to control an electronic device, wherein the first processing signal is composed of first and second pulse signals, and wherein the first circuit generates the first pulse signal in response to a level change variation of the first phase signal, and the first circuit generates the second pulse signal in response to a level change variation of the second phase signal;

a second circuit configured to generate a second processing signal to control the electronic device, wherein the second circuit generates the second processing signal in response to the level change variation of at least one of the first and second phase signals;

a third circuit configured to generate a third processing signal to control the electronic device, wherein the third circuit generates the third processing signal in response to the level change variation of at least one of the first and second phase signals; and a selector configured to acquire first, second, third, and fourth time intervals from adjacent first and second pulse signals based on the first processing signal, wherein the selector is configured to select the first processing signal, the second processing signal, or the third processing signal to control at least one of a speed or a position of the electronic device, and further wherein the selector is configured to select— the first processing signal if the first, second, third, and fourth time intervals are each equal to one another;

the second processing signal when the first time interval plus the second time interval is equal to the third time interval plus the fourth time interval; and the third processing signal for all other conditions.

2. The correction device of claim 1 wherein the first time interval is the time between a first phase signal rising edge and a second phase signal rising edge, the second time interval is the time between a second phase signal rising edge and a first phase signal falling edge, the third time interval is the time between a first phase signal falling edge and a second phase signal falling edge, and the fourth time interval is the time between a second phase signal falling edge and a first phase signal rising edge.

3. The correction device as of claim 1 wherein the first circuit comprises a first one-shot detection circuit configured to generate the first pulse signal according to detection of rising and falling edges of the first phase signal, a second one-shot detection circuit configured to generate the second pulse signal according to detection of rising and falling edges of the second phase signal, and an OR gate coupled between the first one shot detection circuit and the second one-shot detection circuits and configured to generate the first processing signal.

4. The correction device of claim 1 wherein the second circuit comprises a third one-shot detection circuit configured to generate the first processing signal according to detection of rising and falling edges of either the first or second phase signals, a first count value stored in a first register as the first processing signal resets a first up counter, a first divider coupled to the first register and configured to generate a second count value according to the first count value divided by a first value, and a first down-counter coupled to the first divider and configured to generate a first zero detection signal to control a first zero detector outputting the second processing signal when the second count value is zero.

5. The correction device of claim 4 wherein the first value is 2 and the second processing signal is a half period of the first processing signal.

6. The correction device of claim 5 wherein the first divider is a circuit divided by 2.

7. The correction device of claim 1 wherein the third circuit comprises a fourth one-shot detection circuit configured to generate the first processing signal according to detection of rising or falling edges of either the first or second phase signals, a third count value stored in a second register as the first processing signal resets a second up-counter, a second divider coupled to the second register and configured to generate a fourth count value according to the third count value divided by a second value, and a second down-counter coupled to the second divider and configured to generate a second zero detection signal to control a second zero detector outputting the third processing signal as the fourth count value is zero.

8. The correction device of claim 7, wherein the second value is 4 and the third processing signal is one fourth of the first processing signal.

9. The correction device of claim 1 wherein the electronic device is a motor for an inkjet printer.

10. The correction device of claim 1 wherein each of the first circuit, the second circuit, the third circuit, and the selector is carried by an inkjet printer.

11. The correction device of claim 1, further comprising:

an encoder strip; and an encoder configured to move on the encoder strip and generate the first phase signal and the second phase signal.

12. The correction device of claim 1 wherein the electronic device is a motor for an inkjet printer, and wherein the correction device further comprises:

a speed control circuit configured to control the speed of the motor in response to the first processing signal, the second processing signal, or the third processing signal; and a position control circuit configured to control the position of the motor in response to the first processing signal, the second processing signal, or the third processing signal.

13. A device receiving first and second periodic phase signals, the device comprising:

first means for generating a first processing signal to control an electronic device, wherein the first processing signal is composed of first and second pulse signals, and wherein the first means generates the first pulse signal in response to a level change variation of the first phase signal, and the first means generates the second pulse signal in response to a level change variation of the second phase signal;

second means for generating a second processing signal to control the electronic device, wherein the second means generates the second processing signal in response to the level change variation of at least one of the first and second phase signals;

third means for generating a third processing signal to control the electronic device, wherein the third means generates the third processing signal in response to the level change variation of at least one of the first and second phase signals; and fourth means for acquiring first, second, third, and fourth time intervals from adjacent first and second pulse signals based on the first processing signal; and fifth means for selecting the first processing signal, the second processing signal, or the third processing signal to control at least one of a speed or a position of the electronic device, and further wherein the fifth means selects— the first processing signal if the first, second, third, and fourth time intervals are each equal to one another;

the second processing signal when the first time interval plus the second time interval is equal to the third time interval plus the fourth time interval; and the third processing signal for all other conditions.

14. The device of claim 13 wherein:

the first time interval is the time between a first phase signal rising edge and a second phase signal rising edge;

the second time interval is the time between the a second phase signal rising edge and a first phase signal falling edge;

the third time interval is the time between a first phase signal falling edge and a second phase signal falling edge; and the fourth time interval is the time between a second phase signal falling edge and a first phase signal rising edge.

15. The device of claim 13 wherein the first means comprises a first one-shot detection circuit configured to generate the first pulse signal according to detection of rising and falling edges of the first phase signal, a second one-shot detection circuit configured to generate the second pulse signal according to detection of rising and falling edges of the second phase signal, and an OR gate coupled between the first one shot detection circuit and the second one-shot detection circuit and configured to generate the first processing signal.

16. The device of claim 13 wherein the second means comprises a third one-shot detection circuit configured to generate the first processing signal according to detection of rising and falling edges of either the first or second phase signals, a first count value stored in a first register as the first processing signal resets a first up-counter, a first divider coupled to the first register and configured to generate a second count value according to the first count value divided by a first value, and a first down-counter coupled to the first divider and configured to generate a first zero detection signal to control a first zero detector outputting the second processing signal when the second count value is zero.

17. The device of claim 13 wherein the third means comprises a fourth one-shot detection circuit configured to generate the first processing signal according to detection of rising or falling edges of either the first or second phase signals, a third count value stored in a second register as the first processing signal resets a second up-counter, a second divider coupled to the second register and configured to generate a fourth count value according to the third count value divided by a second value, and a second down-counter coupled to the second divider and generating a second zero detection signal to control a second zero detector outputting the third processing signal as the fourth count value is zero.

18. The device of claim 13 wherein the electronic device is a motor for an inkjet printer.

* * * * *